United States Patent
Olle et al.

(10) Patent No.: US 7,735,270 B2
(45) Date of Patent: Jun. 15, 2010

(54) ROOFTOP EQUIPMENT SUPPORT AND METHOD OF USE

(75) Inventors: Raymond M. Olle, Brecksville, OH (US); Raymond S. Laughlin, Middlefield, OH (US)

(73) Assignee: ERICO International Corporation, Solon, OH (US)

( * ) Notice: Subject to any disclaimer, the term of this patent is extended or adjusted under 35 U.S.C. 154(b) by 121 days.

(21) Appl. No.: 11/605,080

(22) Filed: Nov. 28, 2006

(65) Prior Publication Data

US 2007/0120036 A1    May 31, 2007

Related U.S. Application Data

(60) Provisional application No. 60/741,326, filed on Nov. 30, 2005.

(51) Int. Cl.
*E04B 1/98* (2006.01)
(52) U.S. Cl. .................. 52/167.9; 52/503; 52/504; 52/505; 52/699; 52/701
(58) Field of Classification Search .............. 248/74.1, 248/74.2; 52/167.915
See application file for complete search history.

(56) References Cited

U.S. PATENT DOCUMENTS

| | | | |
|---|---|---|---|
| 2,909,054 A | 10/1959 | Phillips | |
| 3,298,644 A | 1/1967 | Sherburne | |
| 3,390,854 A | 7/1968 | Sherburne | |
| 3,486,726 A * | 12/1969 | Kindorf et. al. | ............. 248/72 |
| 3,599,386 A | 8/1971 | LaLonde | |
| 3,963,205 A | 6/1976 | Hageman | |
| 3,968,323 A | 7/1976 | Blanchet | |
| 3,980,262 A | 9/1976 | Lee | |
| 4,044,428 A * | 8/1977 | Kowalski | ............. 24/16 R |
| 4,429,440 A | 2/1984 | Laughlin et al. | |
| 4,502,653 A | 3/1985 | Curtis, Jr. | |
| 4,516,296 A | 5/1985 | Sherman | |
| 4,542,871 A | 9/1985 | Fortsch | |
| 4,638,966 A | 1/1987 | Ford | |
| 4,708,554 A | 11/1987 | Howard | |
| 4,826,113 A | 5/1989 | Winters | |
| 4,961,553 A | 10/1990 | Todd | |
| 5,141,186 A | 8/1992 | Cusic | |
| 5,217,191 A | 6/1993 | Smith | |
| D367,329 S | 2/1996 | Nelson et al. | |
| 5,855,342 A | 1/1999 | Hawkins et al. | |

(Continued)

*Primary Examiner*—J. Allen Shriver, III
*Assistant Examiner*—Alaeddin Mohseni
(74) *Attorney, Agent, or Firm*—Renner, Otto, Boisselle & Sklar, LLP (57) ABSTRACT

A rooftop equipment support includes a polymer material block and a metal fastener support attached to an upper portion of the block. The fastener support has a fastener portion that is configured to receive one or more fasteners for securing piping or other equipment. According to one embodiment, folded-down lips of the metal fastener portion form a channel configured to accept one or more fasteners, such as pipe clamps. In another embodiment, the metal fastener portion is a plate having one or more threaded inserts. The threaded inserts may be located between a sheet metal part of the fastener portion and a top surface of the polymer material block. The polymer material block may be made of a polyurethane foam material. The metal fastener portion may cover at least part of the edges of a top surface of the polymer material block.

22 Claims, 5 Drawing Sheets

U.S. PATENT DOCUMENTS

| | | |
|---|---|---|
| 6,105,216 A | 8/2000 | Opperthauser |
| 6,305,650 B1 | 10/2001 | Hawkins et al. |
| 6,572,057 B1 | 6/2003 | Roth |
| 6,679,461 B1 * | 1/2004 | Hawkins .................. 248/74.2 |
| 7,168,210 B2 * | 1/2007 | Krovats .................. 52/167.9 |
| D538,148 S | 3/2007 | Dinh et al. |
| 2005/0097836 A1 * | 5/2005 | Krovats .................. 52/198 |
| 2006/0131465 A1 | 6/2006 | Lynch, Jr. et al. |
| 2007/0022676 A1 * | 2/2007 | Krovats .................. 52/167.9 |
| 2008/0054143 A1 * | 3/2008 | Collins et al. .......... 248/227.2 |

\* cited by examiner

FIG. 14

ROOFTOP EQUIPMENT SUPPORT AND METHOD OF USE

This application claims priority under 35 USC 119 to U.S. Provisional Application No. 60/741,326, filed Nov. 30, 2005, which is herein incorporated by reference in its entirety.

BACKGROUND OF THE INVENTION

1. Technical Field of the Invention

The invention is in the field of devices for supporting equipment, such as pipe runs and HVAC equipment, on rooftops of buildings.

2. Description of the Related Art

There is a general need to provide support for rooftop piping systems and equipment, such as electrical conduits, steam or natural gas piping, and HVAC units. It is desirable that support for such equipment elevate the piping or other equipment high enough to clear common rooftop obstacles like expansion joints and seams. The elevation also serves to keep the piping or other equipment from lying directly in standing water. In addition, it is desirable that the supports avoid penetrating any roof membrane on the rooftop. Often such supports are free floating to avoid penetrating the roof membrane, as well as to accommodate movement in the piping systems or other equipment due to expansion or contraction due to temperature fluxuations.

Short links of pressure-treated lumber have often been used as supports. Commonly-available one- or two-hole pipe straps are attached to the links of pressure-treated lumber and are used to secure runs of pipes. There are a number of potential problems with use of wood pieces as rooftop supports. First of all, the wood may rot to the extent that it no longer provides the necessary support. Supporting hardware such as the straps may rust. The wood is heavy and difficult to move. In addition, the wood may be relatively hard, and may rupture the roof membrane. Also, additional tools, such as saws and screwdrivers or socket wrenches, may be required for installation.

Another approach for providing rooftop support for equipment are mounting structures shown in U.S. Pat. Nos. 5,855,342 and 6,679,461. Such devices involve a block of polyethylene foam having a recess in one surface. A channel or strut is located in the recess. Clamping hardware may be secured to the recessed channel or strut. Though this product does overcome many of the disadvantages of pressure-treated lumber supports, there is still room for improvement regarding devices in this field of endeavor.

SUMMARY OF THE INVENTION

According to an aspect of the invention, a rooftop equipment support includes: a polymer material block; and a metal fastener support attached to an upper portion of the block. The metal fastener support covers at least edges of the upper portion of the block. The metal fastener support includes a fastener portion configured to receive one or more fasteners.

According to another aspect of the invention, a rooftop equipment support includes: a polymer material block; a metal plate attached to the polymer material block; and one or more threaded inserts attached to the plate. The one or more threaded inserts are between the plate and a top surface of the plate.

According to yet another aspect of the invention, a rooftop equipment support includes: a polymer material block; and a metal plate attached to the polymer material block. The metal plate has a pair of downturned lips, above the polymer material block, that define a channel therebetween for receiving a fastener.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A rooftop equipment support includes a polymer material block and a metal fastener support attached to an upper portion of the block. The metal fastener support may be attached to the top of the block by use of a suitable adhesive. The fastener support has a fastener portion that is configured to receive one or more fasteners for securing piping or other equipment. According to one embodiment, folded-down lips of the metal fastener portion form a channel configured to accept one or more fasteners, such as pipe clamps. In another embodiment, the metal fastener portion is a plate having one or more threaded inserts. The threaded inserts may be located between a sheet metal part of the fastener portion and a top surface of the polymer material block. The threaded inserts may be configured in an array for affixing thereto suitable fasteners, for example, suitable clamps, struts, or posts. The polymer material block may be made of a polyurethane foam material, and may have any of a variety of suitable shapes, for example, being a parallelepiped or a tapered, trapezoidal-shaped block. The metal fastener portion may cover at least part of the edges of a top surface of the polymer material block. This may aid in protecting the polymer material block from physical damage during handling and/or installation. In addition, the covering of the polymer material block by the metal fastener portion may aid in protecting the polymer material block from exposure to UV solar radiation, which may otherwise cause deterioration of the polymer material block.

Figures 1, 2, 3:
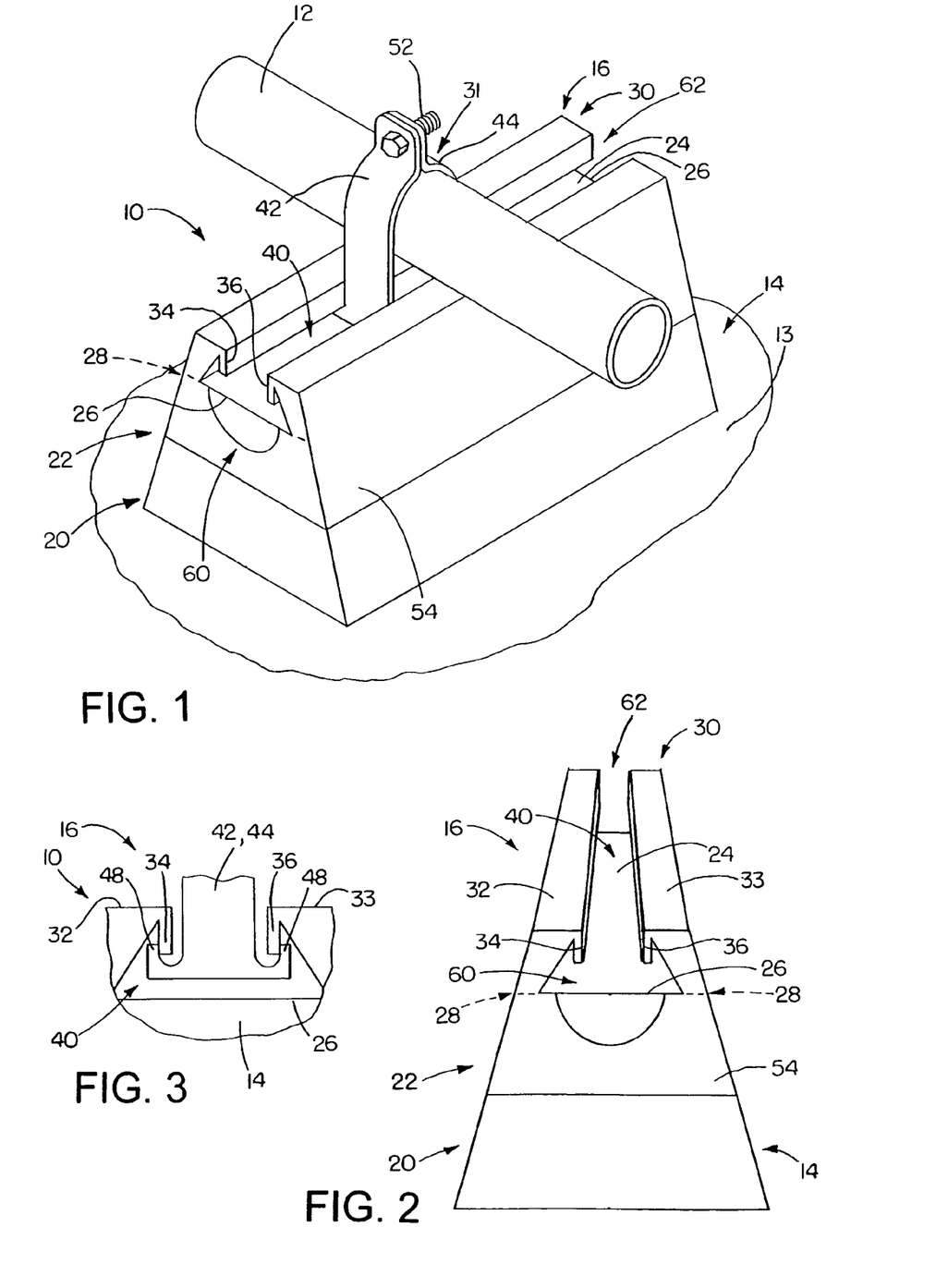
FIG. 1 is an oblique view of a first embodiment rooftop equipment support in accordance with the present invention.
FIG. 2 is a different, partially exploded view of the equipment support of FIG. 1, emphasizing the end of the equipment support, and showing details of the channel.
FIG. 3 is an end view of part of the support of FIG. 1, illustrating the coupling of a fastener into the channel of the support.

Referring initially to FIGS. 1 and 2, a rooftop equipment support 10 is shown, illustrated as supporting a pipe 12 on a rooftop 13. The equipment support 10 includes a polymer material block 14 and a fastener support 16.

The polymer material block 14 has a relatively wide base or bottom portion 20, and tapers to a relatively narrow top portion 22. The top portion 22 of the polymer material block 14 is defined herein as the upper half of the polymer material block 14. Similarly, the bottom portion 20 of the polymer material block is defined as the lower half of the polymer material block 14. The wide base 20 provides a stable surface for placement on a rooftop. The wide base 20 effectively spreads the force from the weight of the pipe 12 or other equipment over a larger area. The relatively wide base 20 also aids in maintaining stability of the equipment support 10, in preventing the equipment 10 from tipping.

The polymer material block 14 may be made of any of a variety of suitable materials. An example of a suitable material is polyethylene foam. Desirable characteristics for the resilient material of the block 14 include weatherability and compatibility with adhesives used to attach the fastener portion 16 to the polymer material block 14. It may also be desirable for the polymer material block 14 to have an appropriate degree of resilience. A certain amount of resilience in the polymer material block aids in situations where uneven surfaces are encountered. In addition, a certain degree of resilience facilitates maintaining the integrity of a roof membrane upon which the equipment support 10 is mounted. However, it is advantageous to avoid use of overly soft materials for the polymer material block 14, as materials that compress or bend too easily may undergo undesirable changes of shape under heavy loads. It will be appreciated that the material for the polymer material block 14 may be selected from a large universe of suitable candidate materials. It may be desirable to employ different types of materials having different characteristics, for example different expected loading conditions.

As best seen in FIG. 2, the polymer material block 14 has a substantially planar top surface 24, which has edges 26. Corners 28 are located at the intersection of the edges 26 of the planar top surface 24. As illustrated, the top surface 24 is uninterrupted by any recesses or protrusions in the polymer material block 14. The side surfaces and bottom surface of the polymer material block 14 may similarly lack any sort of recesses or protrusions. This enhances the structural integrity of the polymer material block 14, and may result in improved structural performance and/or weatherability of the polymer material block 14. However, it will be appreciated that it is possible to include suitable recesses and/or protrusions in the resilient material, as may be desired for any of a variety of purposes.

The fastener support 16 is attached to the top portion 22 of the polymer material block 14. Fastener supports 16 may be made out of sheet metal, for instance sheet steel, and includes a fastener portion 30 for receiving and holding in place a fastener 31. The fastener portion 30 includes a pair of planar-topped protrusions 32 and 33 having respective downturned lips 34 and 36 that together define a channel 40 for receiving and securing the fastener 31. The fastener 31 employs a pair of clamp sections 42 and 44. With reference now in addition to FIG. 3, the bottom part of the clamp sections 42 and 44 each include a flange 46 having upturned fingers 48. The upturned fingers 48, in combination with the downturned lips 34 and 36, aid in keeping the clamp sections 42 and 44 within the channel 40, while still allowing sliding of the clamp sections 40 and 42 along the channel 40. Clamp sections 42 and 44 are coupled together around the pipe 12, and are secured with a bolt 52.

The fastener support 16 has a bottom strip 54 that covers at least part of the edges 26 of the planar top surface 24 of the polymer material block 14. In particular, the bottom strip 54 covers the upper corners 28 of the polymer material block 14. Covering the portions of the edges 26 and the corners 28 aids in preventing damage to the parts of the polymer material block 14. The bottom strip 54 may extend substantially all the way around the top portion 22 of the polymer material block 14.

The ends 60 and 62 of the fastener portion 16, along the channel 40, may be substantially open to allow the bottom flanges 46 of the clamp sections 42 and 44 to be inserted and removed. It will be appreciated that alternatively it may be possible to insert the clamp sections 42 and 44 into the channel 40, or remove the clamp sections 42 and 44 from the channel 40, by other methods, such as by twisting the clamp sections 42 and 44 while the ends 60 and 62 are disengaged from the channel 40.

The metal fastener support 16 overlies most or substantially all of the top surface 24 of the polymer material block 14. This aids in protecting the polymer material block 14 from weather damage, such as damage due to exposure to the sun, as well as damage that may occur from exposure to precipitation in the form of rain and/or snow.

The tapered shape of the polymer material block 14 offers other advantages as well. Since the top portion 22 of the polymer material block is wider than the base 20, the metal fastener portion 16 may be relatively small, yet still able to surround all of the top surface 24 of the polymer material block 14. A larger and heavier metal plate would be required to cover a rectangular polymer material block that was not tapered. In addition, the tapered shape of the polymer material block 14 aids in keeping the metal fastener portion 16 from slipping downward under load. Nonetheless non-tapered shapes may be utilized for the polymer material block 14, if desired.

The fastener portion 16 may be made of a suitable sheet metal material, for example, suitable sheet steel. Possible materials for the fastener support include mild steel that is either electro-galvanized or hot-dipped galvanized to provide corrosion protection. Other alternative materials for the fastener supports include stainless steel, and fiber-reinforced plastic or glass-filled resin with or without metal inserts that function as lips to engage strut hardware. The fastener portion 16 may be fabricated by suitable bending and welding processes. It will be appreciated that a variety of other suitable processes may be used for fabricating the fastener support 16.

The polymer material block may include polyethylene foam or polyurethane foam. Other alternatives for the polymer material block 14 include rigid thermal plastic or thermoset plastic. Either of these materials may have increased strength provided through a suitable glass fill material.

The polymer material block may also advantageously aid in mechanically isolating equipment from a rooftop upon which the equipment is mounted. Resilient material in the polymer material block may provide some dampening of vibrations in equipment such as air conditions, heaters, or exhaust fans.

Any of a variety of suitable adhesives may be used for attaching the metal fastener portion 16 to the polymer material block 14. An example of a suitable adhesive is a hot melt adhesive sold under the name BONDMASTER INSTAWELD 34-3378.

What follows now are various alternate embodiment equipment supports. Many of the features of the alternate embodiment supports described below may be similar to corresponding features of the support 10. Discussion of these similar features is abbreviated or omitted in the below description of the alternate embodiment supports, although it will be understood that the alternate embodiment clamps may include other features corresponding to those of the support 10. In addition, it will be appreciated that various features from the various embodiments may be combinable with one another. In addition, various configurations are described herein for using one or the other of the equipment support embodiments. It will be appreciated that embodiments other than those shown in a particular configuration may be usable in that configuration or a similar configuration.

Figure 4:
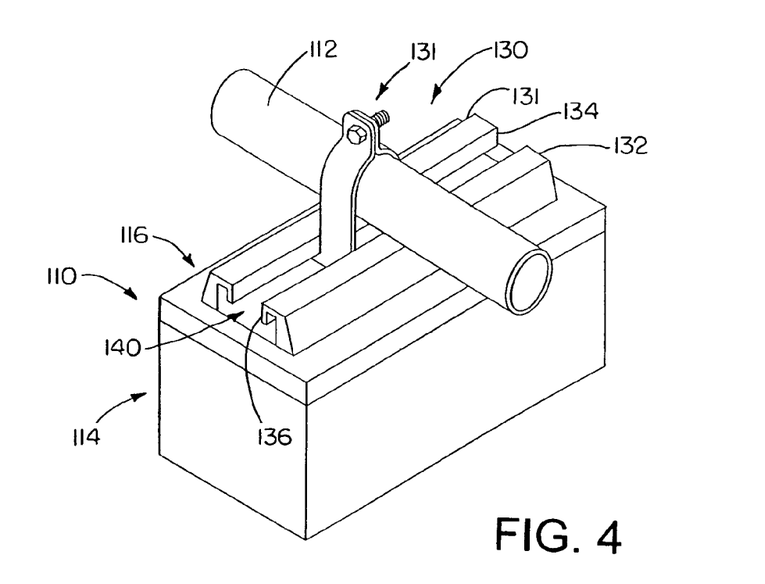
FIG. 4 is an oblique view of a second embodiment rooftop equipment support in accordance with the present invention.

FIG. 4 shows an alternate embodiment equipment support 110 that utilizes a rectangular or parallelepiped shaped polymer material block 114. A fastener support 116 is adhesively attached to the polymer material block 114. The metal fastener support 116 has an upturned fastener portion 130 with a pair of protrusions 131 and 132 bent upward, inward, and then downward to form a pair of downturned lips 134 and 136, defining a channel 140. The channel 140 may be used for receiving and securing fasteners such as a fastener 131, for use in securing a pipe 112.

Figures 5, 6:
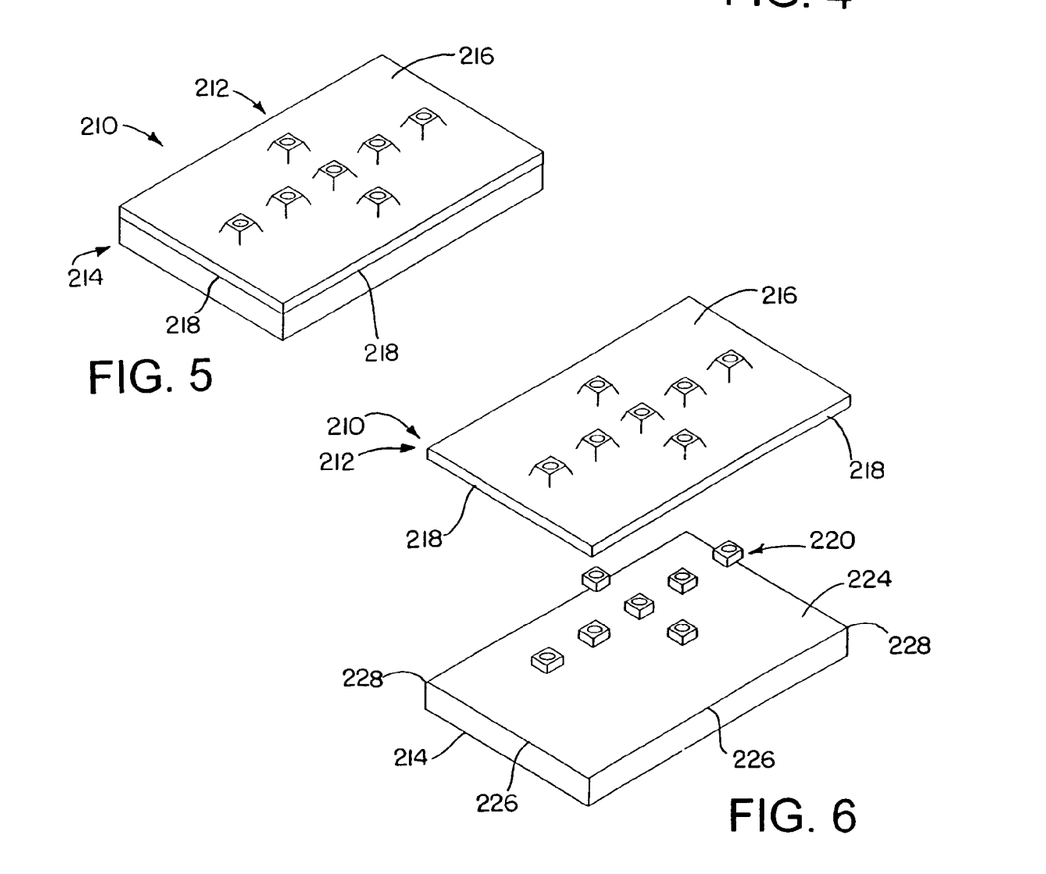
FIG. 5 is an oblique view of a third embodiment rooftop equipment support in accordance with the present invention.
FIG. 6 is an exploded view of the rooftop equipment support of FIG. 4.

FIGS. 5 and 6 show an equipment support 210 that includes a fastener support 212 attached to a polymer material block 214. The fastener support 212 includes a planar portion 216 having downturned edges 218, and threaded inserts 220. The threaded inserts 220 are attached to an underside of the planar portion 216. When the equipment support 210 is assembled by attaching the fastener support 212 to the polymer material block 214, the threaded inserts 220 are located between the planar portion 216 and a top surface 224 of the polymer material block 214. The threaded inserts 220 may be any of a variety of suitable devices, such as strut nuts or cinch nuts welded or otherwise attached to the underside of the planar portion 216. As another alternative, the threaded inserts 220 may be extruded, internally-threaded portions. The downturned edges 218 of the fastener support 212 cover at least part of edges 226 and/or corners 228 of the top surface 224 of the polymer material block 214.

The planar portion 216 of the fastener support 212 has an array of holes 230 therein corresponding to the locations of the underlying threaded inserts 220. The presence of the threaded inserts 220 allows a variety of fasteners to be mounted to the equipment support 210, for mounting pipes, conduits, or other equipment. Using the array of threaded inserts 220, a variety of attachments may be coupled to the equipment 210 for supporting various sizes and weights of equipment. The attachments that may be coupled to the equipment support 210 include, but are not limited to, commercially available struts, strut fittings, and support columns. By having the planar portion 216 extend substantially over all of the top surface 224 of the block 214, loads on the equipment support 210 may be spread to a maximum amount over the block 214.

FIGS. 7-14 show several possible applications of the equipment support 210. It will be appreciated that the illustrated examples are only a few of the many possible ways of using the equipment supports disclosed herein.

Figure 7:
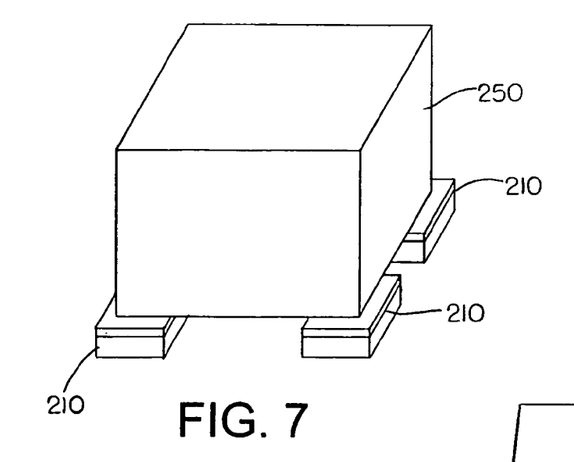
FIG. 7 is an oblique view showing a first configuration for use of the equipment support of FIG. 4.

FIG. 7 shows use of multiple of the equipment supports 210 to support the corners of a piece of equipment 250. The equipment piece 250 may be any of a variety of equipment mounted on a rooftop. Examples include air conditioners, heaters, and exhaust fans. The equipment supports 210 support the weight of the equipment 250, while protecting the underlying rooftop membrane from damage. The supports 210 may also provide a measure of vibration dampening, at least reducing the level of vibration from the equipment 250 that is transmitted to the roof. Suitable mounting hardware may be used to attach the equipment 250 to the equipment supports 210, through use of the threaded inserts 220 of the equipment supports 210. Alternatively, the equipment 250 may simply be placed upon the equipment supports 210, with the weight of the equipment 250 being relied upon to keep it in place.

Figure 8:
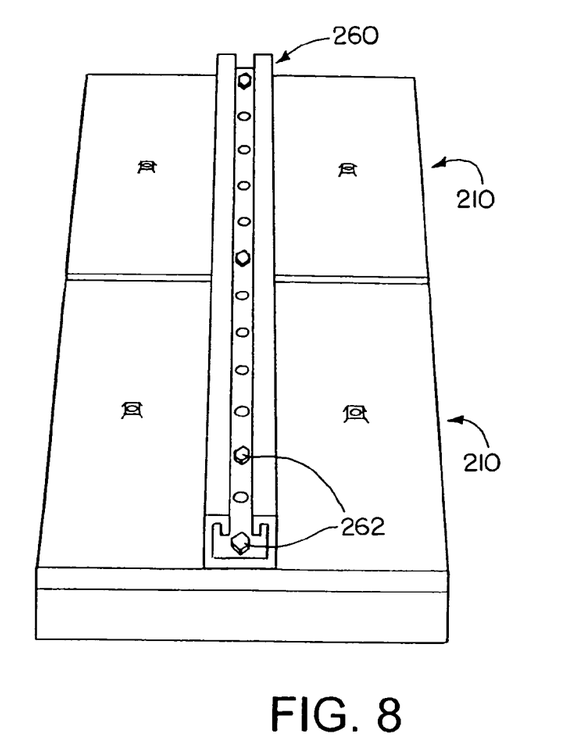
FIG. 8 is a view showing a second configuration for use of the equipment support of FIG. 4.

FIG. 8 shows a pair of equipment supports 210 in a side-by-side position, with a strut 260 attached to both of the equipment supports 210, via bolts 262 that engage the threaded inserts 220 of the equipment support 210. It will be appreciated that a large variety of suitable commercially-available struts may be employed, and that such struts 260 may be used to support a wide variety of fasteners and equipment.

Figure 9:
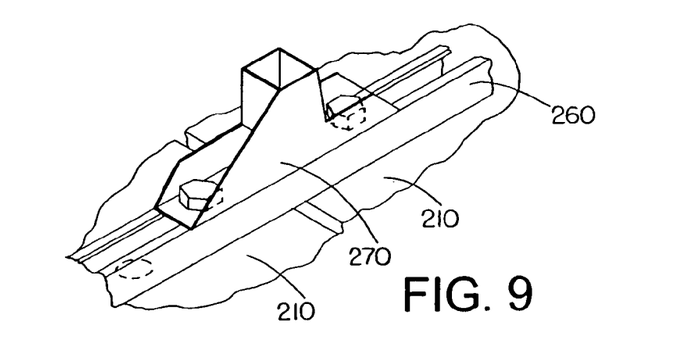
FIG. 9 is detailed view showing a portion of a variant of the configuration of FIG. 7.
Figure 10:
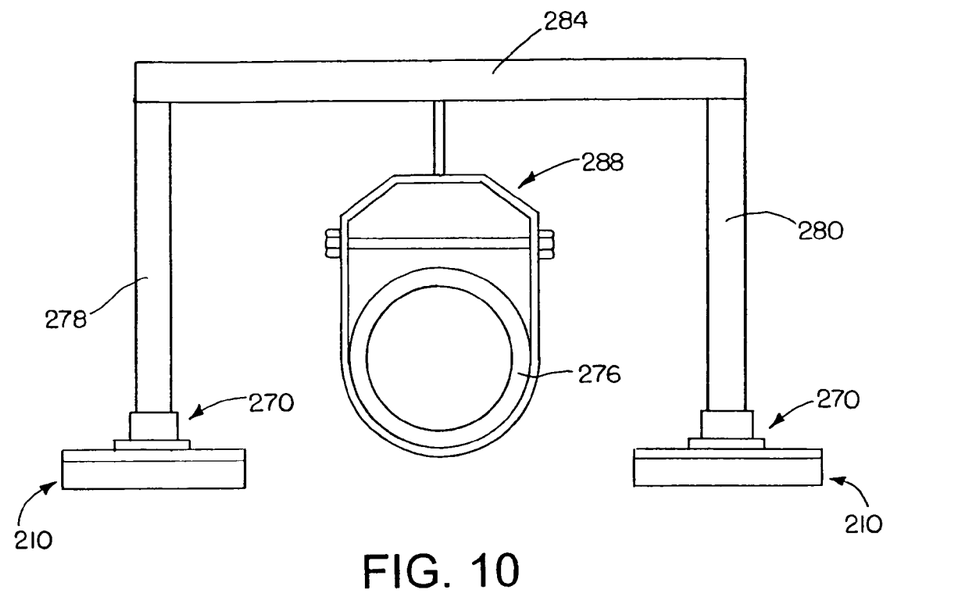
FIG. 10 is an end view showing a third configuration for use of the equipment support of FIG. 4.

FIG. 9 shows one example of equipment that may be supported on the strut 260, a column support 270. As shown in FIG. 10, the column support 270 may be used to support large industrial piping or air ducts 276. Columns 278 and 280 may be used to support a cross member 284, which has hanging from it a clevis hanger 288 to support the piping or air ducts 276.

Figure 11:
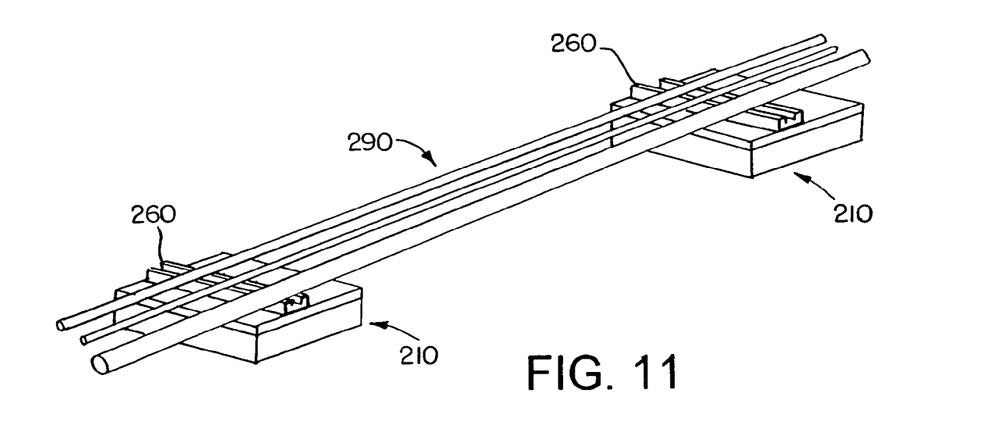
FIG. 11 is an oblique view showing a fourth configuration for use of the equipment support of FIG. 4.

FIG. 11 shows use of a pair of equipment supports 210, with strut sections 260 mounted to them, to support multiple runs of conduit for piping 290. Strut clamps 292 may be used to attach the conduits or piping 290 to the struts 260.

Figure 12:
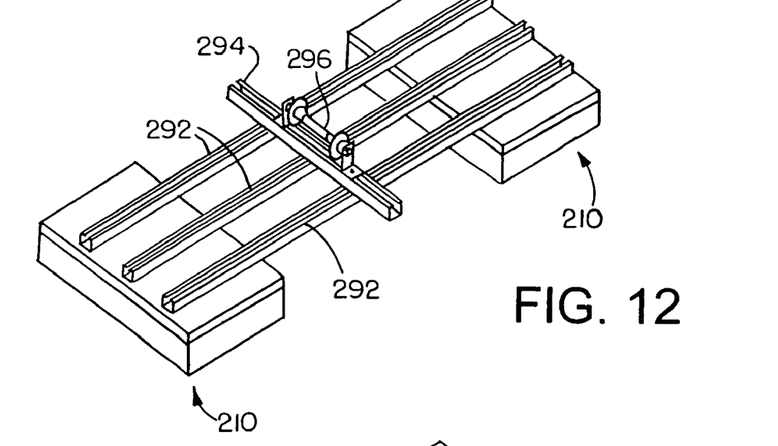
FIG. 12 is an oblique view showing a fifth configuration for use of the equipment support of FIG. 4.
Figure 13:
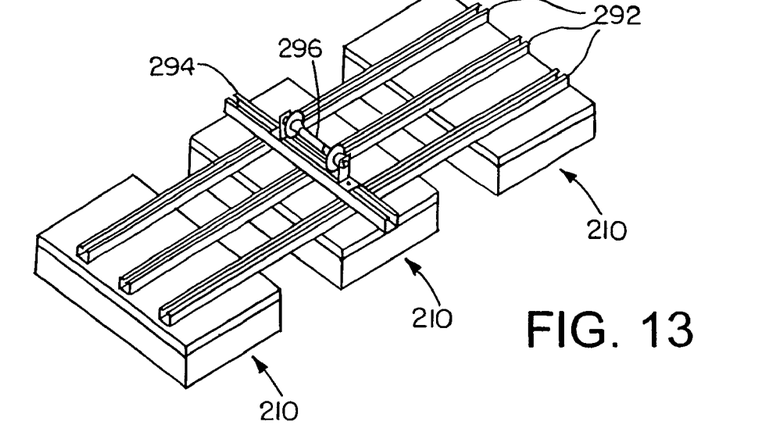
FIG. 13 is an oblique view showing a sixth configuration for use of the equipment support of FIG. 4.
Figure 14:
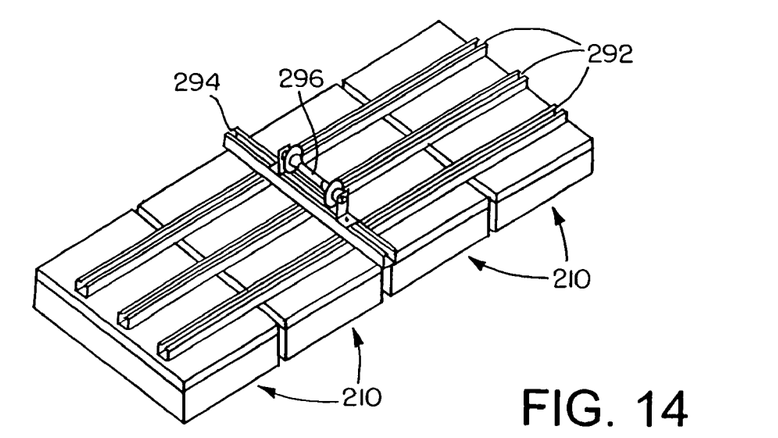
FIG. 14 is an oblique view showing a seventh configuration for use of the equipment support of FIG. 4.

As illustrated in FIGS. 12-14, various spacings of equipment supports 210 may be used to support piping runs of various weights. Three struts 292 may be attached to two or more of the equipment supports 210, with an additional strut 294 and an optional roller 296 attached perpendicular to the strut 292. The roller 296 may allow for some movement of supported piping, such as from thermal expansion and contraction. For relatively light piping fewer of the equipment supports 210 may be required, and the equipment supports may be spaced further apart, as illustrated in FIG. 13. For heavier pipings, as illustrated in FIG. 15 more of the equipment supports 210 may be utilized, and the equipment supports 210 may be placed closer together, even to the point of being adjacent to one another.

The equipment supports described above provide versatile and effective ways for supporting a wide variety of pipes, conduits, and other types of equipment on rooftops.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means")used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rooftop equipment support comprising:
a polymer material block; and
a metal fastener support attached to an upper portion of the block;
wherein the metal fastener support covers at least edges of the upper portion of the block;
wherein the metal fastener support includes a fastener portion configured to receive one or more fasteners;
wherein the metal fastener support is a sheet metal part that has a bottom strip that covers upper outer corners of a planar top surface of the block; and
wherein the bottom strip extends substantially all the way around sides of the upper portion of the block.

2. The support of claim 1, wherein the polymer material includes a resilient material.

3. The support of claim 2, wherein the resilient material includes a polymer foam.

4. The support of claim 1, further comprising a fastener releasably coupled to the fastener portion.

5. The support of claim 4, wherein substantially all of the fastener portion is above substantially all of the block.

6. The support of claim 1, wherein the block is substantially a parallelepiped.

7. The support of claim 1, wherein the block has a relatively wide bottom section that tapers to a relatively narrow top section.

8. The support of claim 7, wherein the block has a trapezoidal cross-section.

9. The support of claim 1, wherein the metal fastener support covers substantially all of a top surface of the block.

10. The support of claim 1,
wherein the fastener portion includes a pair of downturned lips that define a channel therebetween and below the lips for receiving the fastener;
wherein the edges are outer edges of a top planar surface of the block; and
wherein all of the channel is above the top planar surface of the block.

11. The support of claim 1, wherein the fastener portion includes one or more threaded inserts attached to a planar portion.

12. The support of claim 11, wherein the one or more threaded inserts are between the planar portion and the top surface of the block.

13. The support of claim 1, wherein the metal fastener support is adhesively attached to the polymer material block.

14. A rooftop equipment support comprising:
a polymer material block; and
a metal plate attached to the polymer material block;
wherein the metal plate has a pair of downturned lips, above the polymer material block, wherein the lips are separated from each other, so as to define a channel between the lips and below the lips, for receiving a fastener;
wherein the metal plate includes a pair of ends that keep the lips spaced apart; and
wherein a top surface of the block is a bottom boundary of the channel.

15. The support of claim 14, wherein the polymer material includes a resilient material.

16. The support of claim 14, further comprising a fastener releasably coupled to the downturned lips.

17. The support of claim 1, wherein the metal fastener support also covers corners of the block where the edges intersect.

18. The support of claim 1, wherein the edges are outer edges of a top planar surface of the block.

19. The support of claim 18, wherein the top surface is uninterrupted by any recesses or protrusions of the polymer material block.

20. The support of claim 1,
wherein the planar top surface of the block is uninterrupted by any recesses or protrusions; and
wherein the fastener support includes a fastener portion, above the planar top surface, that includes a pair of planar protrusions having respective downturned lips that together define a channel for receiving and securing a fastener.

21. The support of claim 10, wherein the top surface is uninterrupted by any recesses or protrusions of the polymer material block.

22. The support of claim 10, wherein the top surface is a bottom boundary of the channel.

* * * * *